UNITED STATES PATENT OFFICE 2,592,711

FERMENTATION PROCESS

Herman Knaust and Henry Knaust, Saugerties, N. Y.

No Drawing. Application August 19, 1948, Serial No. 45,213

4 Claims. (Cl. 71—5)

This invention relates to fermentation processes and more particularly to those processes involving the evolution of by-products of a noxious or otherwise undesirable nature. Specifically, the present invention may be applied in the process of curing compost for mushroom culture and, as will be apparent from the description which follows, the invention may likewise be applied in various other fermentation processes, for example in the production of alcohol and other products secured by the fermentation of grain and other vegetable matter. The invention is also useful in controlling the development of microorganisms in such processes, increasing or decreasing their numbers, stimulating them, or destroying them, as the process may require.

The general object of the present invention is the provision, in a fermentation process, of a procedure for controlling bacterial growth and/or for oxidizing undesired by-products, and thus removing them from the process. In addition to oxidizing evolved gases, or some of them, the invention may include the physical removal of any unoxidized fractions of the undesired fermentation by-products by means of air currents. The process step or steps comprising the invention may be carried out intermittently or continuously and in a quiescent or a changing atmosphere.

The reaction products resulting from oxidation of the fermentation by-products may be of such a nature as to benefit the main product resulting from the fermentation process in which case there is, of course, no necessity for physically removing such reaction products but, on the other hand, it is advantageous to allow them to remain in the process.

Other and further objects, features and advantages will be apparent from the description which follows.

By way of example, the present invention will be described in connection with the process of preparing and curing a growing medium, known as compost, for the cultivation of mushrooms. One method frequently employed in the preparation and curing of compost consists in using, as starting material, race-track straw and manure to which may be added feeds, grains, nitrates and other materials in various combinations. This mixture is allowed to cure in piles, being turned and handled during the carrying out of the process in order to effectuate even curing throughout the mass. The material is then placed in trays and sealed in rooms. For a period of several days the temperature of the room becomes elevated due to the exothermic nature of the fermentation process, and during this period, the room is allowed to remain at a temperature of approximately 135° F. Throughout this period the $CO_2$ content of the room is quite high.

While the original curing is in progress and after the compost is fermenting in the trays, as mentioned above, free ammonia is evolved. If this free ammonia is present in sufficient concentration the alkalinity or pH of the compost becomes too high and mushroom spawn will not "run" successfully in the compost. Heretofore, it has been considered that if the pH of the compost exceeds 7.3 the spawn will not run successfully, that is to say, the mushroom production is injured both quantitatively and qualitatively. For this reason it has been the practice to incorporate various materials, for example gypsum or acid phosphate, in the compost to "fix" or neutralize the ammonia, keeping the pH of the compost at 7.3 or below. This procedure has involved serious difficulties by reason of the cost of the additive materials, and the necessary handling.

The present invention comprises introducing ozone into the compost, or other material undergoing fermentation and curing. One method is to introduce ozone into the room where the trays of compost are stacked and to leave the room open at the ceiling ventilators, instead of sealing it as has been the practice heretofore. The introduction of ozone is continued for some hours until all traces of ammonia have disappeared. The room is then sealed and fermentation and oxidation continue, bringing the temperature of the closed room to approximately 135° F. within a matter of hours, instead of days.

As an additional advantage, the bacteria count of the compost is increased many-fold, lending improved characteristics for mushroom culture, and the curing time is reduced by one-half or more.

Apparently the ozone combines with the evolved ammonia to form water, nitrosates and nitrosites the latter, however, not having been specifically identified. As a result, smaller quantities of additive materials, or none at all, need be used to enrich the compost, and a better compost is formed. Moreover, it has been found that mushroom spawn will run successfully in a compost having a pH as high as 9.0, if it is cured in the described manner, i. e., with the addition of ozone. The invention, therefore, offers a means whereby the biological and chemical process of the fermentation can be controlled by controlling the proportions of ozone employed. It has been determined that this proportion may vary considerably, a proportion of 4 parts of ozone per million parts of air, for example, being suitable.

As a specific example of the application of the present invention, the following process may be employed. As a starting material, we use one ton of race track straw (a mixture of straw and manure) or ordinary horse manure as commonly used in mushroom culture. This material is partially cured in piles in any manner ordinarily used in the mushroom industry and is then placed in wooden trays, each having a capacity of approximately 125 lbs. of compost.

One thousand of these trays, stacked six inches apart, are placed in a room 36 ft. x 50 ft. x 16 ft. high with ceiling ventilators which are left open. Approximately 25 lbs. of ozone is introduced into the room over a period of 30 to 60 hours. This ozone is supplied by commercial machines, delivering into the room 1400 cubic feet of air per minute, along with the ozone. During the 30 hour period, the temperature of the room is kept below 100° F. At the end of the 30 hour period, the room is sealed and the normal procedure for curing the compost is followed, except that it will be found the curing time is much reduced.

The period of ozone introduction may range from 30 to 60 hours, and the volume of air may vary from 500 cu. ft. to 5000 cu. ft. per minute. Ozone may also be injected directly into the compost, instead of into the atmosphere, if desired, in suitable concentration.

The quantity of ozone introduced into the room, over the period, may be varied from 1 lb. to 500 lbs. and the period over which it is introduced may be varied depending upon the temperature and moisture content of the air in the room, and the type of curing desired for the resulting compost. As an example of the use of the foregoing process to increase the bacteria count of the compost, all conditions set forth in the foregoing example, including material used, time, etc., may remain the same, except that instead of leaving the ventilators open in the ceiling of the room, the room is sealed and the temperature is allowed to rise above 100° F.

At such temperature, the ozone breaks down into oxygen thereby stimulating the growth of aerobic bacteria and preventing the formation of $CO_2$.

By use of this method the bacteria count may be increased from between 300,000 and 500,000 to several billion, enriching the compost.

The advantages achieved by the present process include the following:

1. The compost can be employed for mushroom culture in a much "greener" condition, i. e., less curing is required;
2. Compost having a pH as high as 9.0 can be employed successfully;
3. Less raw material is required;
4. Less handling is required;
5. Almost any type of cellular raw material can be used;
6. The fermentation is speeded and the curing time is reduced;
7. A much higher bacteria count in the finished compost is accomplished;
8. The resulting high nitrate value of the compost increases its moisture retention properties;
9. The nitrosates and nitrosites formed in the compost by the oxidation of ammonia are valuable to mushroom growth;
10. Spawn growth is much healthier and faster;
11. The compost is more fertile and longer lasting;
12. Mushroom production per volume of compost is greatly increased.

Obviously, the present invention will be of value in connection with other processes than that of mushroom culture. That is, many of the considerations mentioned above are equally important in connection with the curing of compost for other purposes than mushroom culture. Likewise, many of these considerations apply to other processes than that of curing compost, since many fermentation processes involve the evolution of noxious or undesirable products which may be converted into valuable, or at least not undesirable, by-products by means of oxidation with the use of ozone. Such oxidation occurs much more rapidly and completely than can be accomplished by simple aeration. The ozone may be introduced in high concentration, in a relatively feeble current of air or, when desired, it can be introduced in a weaker concentration, in a relatively strong current of air which may be used to sweep away the reaction products or the unoxidized fermentation by-products, or both.

Having thus described the invention, what is claimed as new and desired to be secured by Letters Patent is:

1. In a process for curing compost for use in mushroom cultivation, comprising the steps of partially curing the compost in piles in the open atmosphere, then placing the compost in trays in an enclosure for further curing, the step of introducing a current of air containing added ozone into the atmosphere surrounding the said curing trays throughout the period of the evolution of ammonia therefrom, said introduction of ozone being discontinued before the said compost in inoculated.

2. A process according to claim 1, the proportion of ozone in said air current being between ¼ part and 25 parts per million.

3. A process according to claim 1, the starting material being raw compost.

4. A process according to claim 1, the proportion of ozone in the air current being 4 parts per million.

HERMAN KNAUST.
HENRY KNAUST.

REFERENCES CITED

The following references are of record in the file of this patent:

UNITED STATES PATENTS

| Number | Name | Date |
|---|---|---|
| 128,227 | Hoffman | June 25, 1872 |
| 2,060,223 | Lambert et al. | Nov. 10, 1936 |
| 2,189,303 | Slotter | Feb. 6, 1940 |

FOREIGN PATENTS

| Number | Country | Date |
|---|---|---|
| 469,413 | France | July 13, 1914 |

OTHER REFERENCES

Chemical Abstracts 35: P 7110(8) Ger. 700.492 (Cl. 6a. 15.03) November 21, 1940, Curt Dorda (to Hefe-Patents G. m. b. H.).

Mellor, Comprehensive Treatise on Theoretical and Inorganic Chemistry, vol. 1, (1922), Longmans, Green & Co., N. Y., pages 891 and 892.

Stoller et al., Journal Paper No. J459 of the Iowa Agricultural Experiment Station, Project No. 444, published in Journal of American Society of Agronomy (1937), pages 717–723.